Feb. 14, 1956   W. SCHAELCHLIN   2,735,059
MOTOR SPEED CONTROL SYSTEM
Filed June 18, 1952   8 Sheets-Sheet 1

WITNESSES:
E. A. M⁽c⁾Closkey.
E. F. Oberhein

INVENTOR
Walter Schaelchlin.
BY
Paul E. Friedemann
ATTORNEY

Feb. 14, 1956  W. SCHAELCHLIN  2,735,059
MOTOR SPEED CONTROL SYSTEM
Filed June 18, 1952  8 Sheets-Sheet 5

INVENTOR
Walter Schaelchlin.

Feb. 14, 1956 W. SCHAELCHLIN 2,735,059
MOTOR SPEED CONTROL SYSTEM
Filed June 18, 1952 8 Sheets-Sheet 7

WITNESSES:
E. A. McCloskey
E. H. Oberheim

INVENTOR
Walter Schaelchlin.
BY
Paul E. Friedemann
ATTORNEY

Feb. 14, 1956  W. SCHAELCHLIN  2,735,059
MOTOR SPEED CONTROL SYSTEM
Filed June 18, 1952  8 Sheets-Sheet 8

WITNESSES:

INVENTOR
Walter Schaelchlin
BY
Paul E. Friedemann
ATTORNEY

United States Patent Office 2,735,059
Patented Feb. 14, 1956

2,735,059

MOTOR SPEED CONTROL SYSTEM

Walter Schaelchlin, Buffalo, N. Y., assignor to Westinghouse Electric Corporation, East Pittsburgh, Pa., a corporation of Pennsylvania Application June 18, 1952, Serial No. 294,148

3 Claims. (Cl. 318—323)

This invention relates generally to electrical control systems and more in particular to such systems which are utilized in controlling an operating quantity of a motor.

In the application of motors to sectionalized mill drives as, for example, paper mills, it has been necessary to provide adequate regulation of speed of the individual motors driving the separate mill stands. The nature of the requirements vary with the application. In some instances the requirements are very exacting, requiring systems which are capable of regulating motor speeds within very close limits. Applications of this type usually require electronic means for detecting speed errors and providing the control quantities for controlling the respective motors. In other instances, however, the requirements, both from the standpoint of accuracy and from the rate at which the speed error is to be corrected, are not so exacting. In such applications, it is feasible to provide a relatively simple and inexpensive follow-up control which is sufficiently fast and accurate for the less exacting requirements.

Accordingly, it is one object of this invention to provide a speed control system for an electric motor which is simple with respect to operational requirements and positive in operation.

Another object of this invention is to provide a system of the character referred to, which utilizes simple and inexpensive elements which are of rugged construction for regulating the speed of a motor.

In another of its aspects, certain features of this invention are applicable in control arrangements providing relatively fast and accurate control of the speed of a motor in dependence of a speed error quantity of the motor. In general, all of the control systems of this invention utilize the differential of a speed reference quantity and an actual speed quantity indicative of the actual speed of the motor for producing a control quantity indicative of speed error. A principle such as this is utilizable in connection with a rate of change of speed quantity in suitable amplifying circuits which are adequately damped in dependence of certain output functions including, for instance, a function of the output of the amplifier and a function of a control quantity of the motor for the purpose of providing a fast and accurate control of motor speed.

To this end it is also a general object of this invention to provide a motor speed regulator utilizing the differential of a motor speed quantity and a reference speed quantity in conjunction with suitable amplifying and control circuits to provide relatively fast and accurate control of speed of the motor to be controlled.

Further to the preceding object, it is also an object of this invention to provide an amplifier system comprised of magnetic amplifiers controlled in dependence of speed error and/or the rate of change of speed error to control the speed of the motor to be controlled.

The foregoing statements are merely illustrative of the various aims and objects of this invention. Other objects and advantages will become apparent upon a study of the following disclosure when considered in conjunction with the accompanying drawings, in which.

Figure 1:
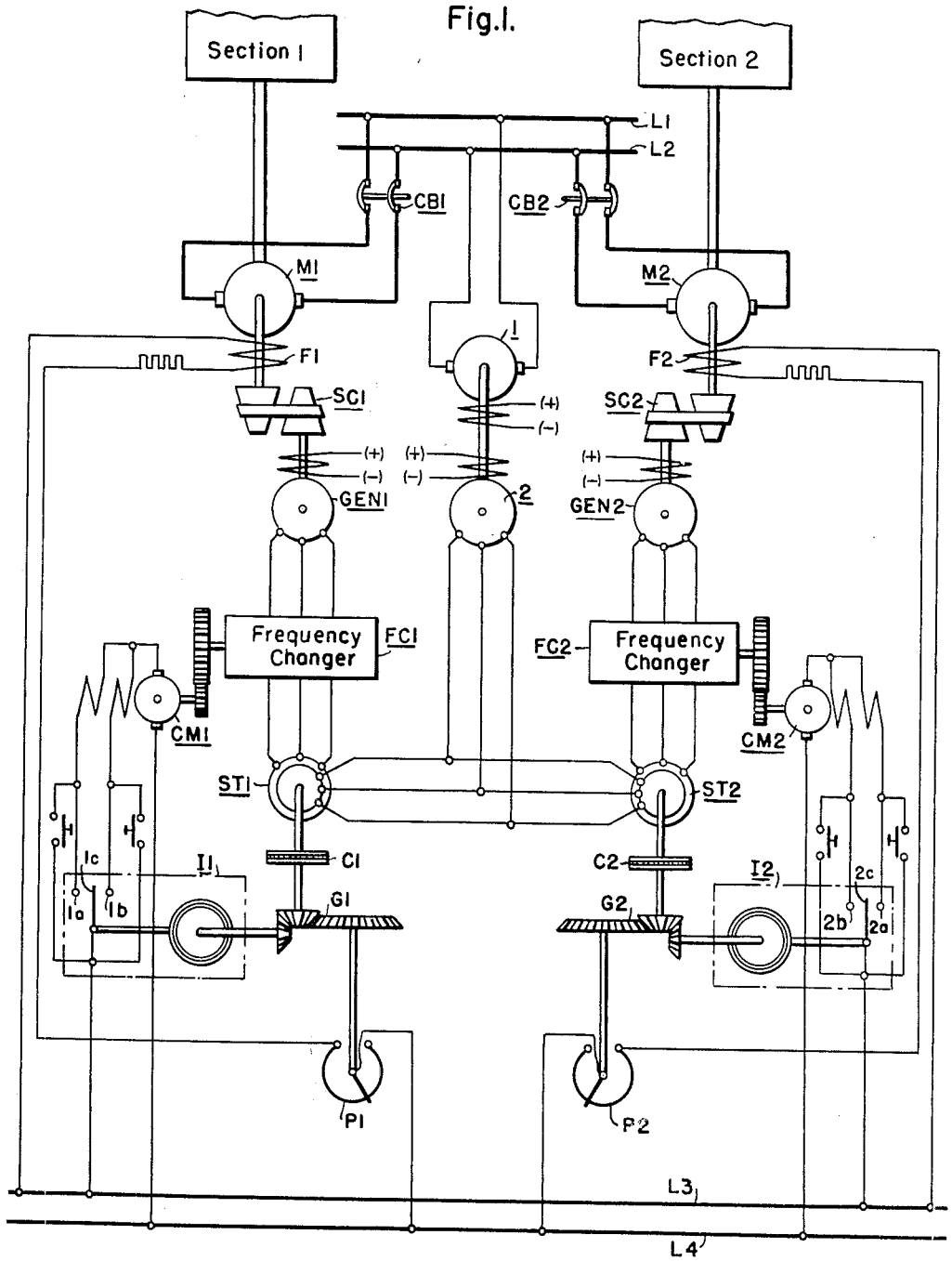
Fig. 1 is a diagrammatic illustration of a sectionalized mill drive illustrating a control system embodying the principles of this invention.

In the sectionalized mill drive illustrated in Fig. 1, the mill sections to be controlled are identified as section 1 and section 2. These respective sections are driven by speed regulated direct current motors designated M1 and M2 and having respective field windings F1 and F2 which are excited by the speed regulating system. The armature circuits of these motors are connected in parallel across the main supply of direct current represented by conductors L1 and L2. Respective circuit breakers CB1 and CB2 connect the respective armature circuits to the main direct current supply.

The regulating systems for controlling the respective motor field windings F1 and F2 are identical in all essential aspects. As earlier noted in these remarks, this basic system is controlled in dependence of the difference between a reference quantity indicative of motor speed and a quantity indicative of the instant speed of the motor to be controlled. In this embodiment of the invention, the device for detecting the difference between these two quantities is electrical in nature and requires the introduction of three-phase alternating current control voltages to its separate inputs. Such a device is represented in a conventional type of differential synchro tie having a three-phase wound stator and a three-phase wound rotor. These devices are respectively designated in Fig. 1 by ST1 and ST2.

The speed reference quantity is produced by a constant speed motor generator set involving a direct current motor 1 energized from the main supply conductors L1 and L2 mechanically connected to and driving an alternating current generator 2, producing a three-phase output of constant frequency. As illustrated, the respective rotors of the differential synchros ST1 and ST2 are connected in parallel across the alternating current supply. Respective motors M1 and M2 drive respective alternating current generators GEN1 and GEN2 through respective speed changers SC1 and SC2 connected therebetween. These speed changers provide for increasing or decreasing the speeds of the respective generators with respect to the respective motors to provide a means of control of motor speeds over a given speed range, for example, of the order of 25 percent of maximum speed. The outputs of respective alternating current generators GEN1 and GEN2 are applied to the respective stators of the differential synchro units through respective frequency changers FC1 and FC2. The differential synchro units produce a mechanical output represented in angular displacement of their rotors in dependence of the difference in the instantaneous phase relationships of the rotor and stator winding voltages. The output torque produced when the stator voltage tends to lead or lag the rotor voltage is applied through suitable gearing, generally designated G1 and G2 for the respective drives and includes a reduction gear connection to respective field voltage control potentiometer rheostats P1 and P2. These respective rheostats are connected in series with the respective motor fields F1 and F2 across the supply of direct current control voltage represented in conductors designated L3 and L4.

The system thus far described is arranged to follow a particular speed error at a relatively low rate to minimize the tendency of the system to overshoot a condition of equilibrium and thereby hunt or oscillate about the equilibrium position. In many instances an arrangement of this type is completely satisfactory if it is permissible to slowly correct the speed error. By utilizing a slow rate of correction such as this, the problem of damping the regulator with adequate feed back circuits is minimized.

However, in every such system, the control at one time or another is called upon to correct rapid changes in speed. In such instances, the slow regulation afforded by a control such as described may be inadequate. To meet the requirements of such a situation, respective inertia controllers I1 and I2 have herein been provided. These are connected to the output of the respective differentials through suitable step up gearing incorporated in the respective gear drives G1 and G2. The details of these respective inertia devices, which are identical, are illustrated in Figs. 2 and 3 wherein inertia device I1 has been specifically illustrated.

The inertia device comprises a suitable stationary housing 10 provided with an input shaft 12 mounted in a bearing 13 formed as an integral part of one end of the housing. The end of shaft 12 within housing 10 is equipped with a spur gear 14 meshed with a smaller gear 15 on the driven shaft 16 of the inertia unit. Shaft 16 is journaled in a bearing 17 formed in the housing immediately below the bearing 13 as viewed. Gears 14 and 15 may correspond to the step up gearing portion of the gear drive G1 or G2 shown in Fig. 1. The inertia components of this device comprise a flywheel type of mass 18 mounted on a shaft 19 journaled in respective needle bearings 20 and 21. Needle bearing 20 is formed in the end of shaft 16 and needle bearing 21 is formed in the end of a bearing adjusting screw 22 secured by a lock nut 23 in the end cover plate 24 of the housing. A disc 25 provided with three slip rings 26, 27 and 28 engaged by respective brushes 29, 30 and 31 is mounted securely to shaft 16 between needle bearing 20 and gear 15 to be driven by shaft 16. This disc is resiliently coupled by a light flat spring 32 to the mass 18 and relative displacement of mass 18 angularly with respect to disc 25 depends upon the magnitude of the angular acceleration of shaft 16. Suitable electrical pick-off means for detecting angular acceleration of a predetermined minimum magnitude is represented in the contacts designated 1a and 1b which are insulatedly supported on disc 25 and connected respectively to slip rings 27 and 28. These contacts cooperate with a contact 1c which is insulatedly supported upon mass 18 in a position intermediate contacts 1a and 1b and electrically connected to the slip ring 26.

Figure 2:
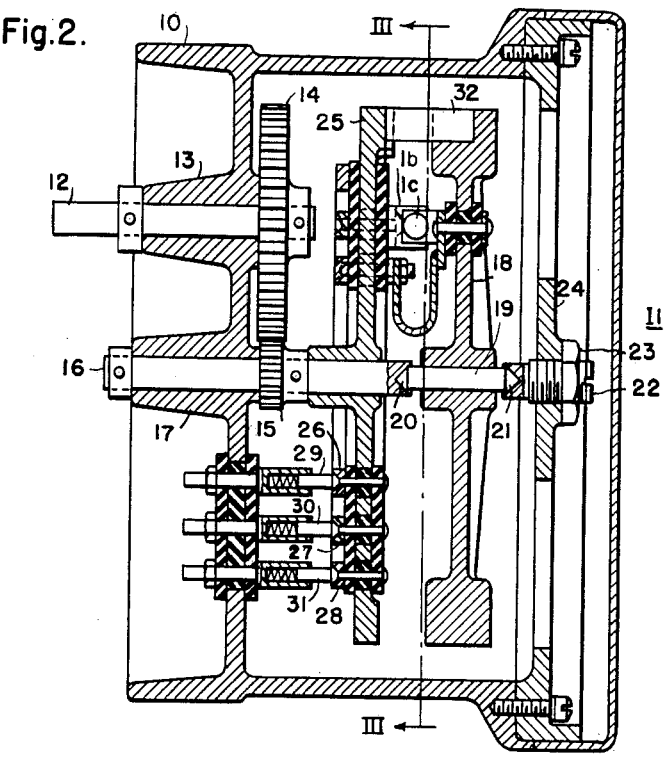
Figs. 2 and 3 are detailed illustrations of an inertia type rate of change of error detector, utilized in the system of Fig. 1.
Figure 3:
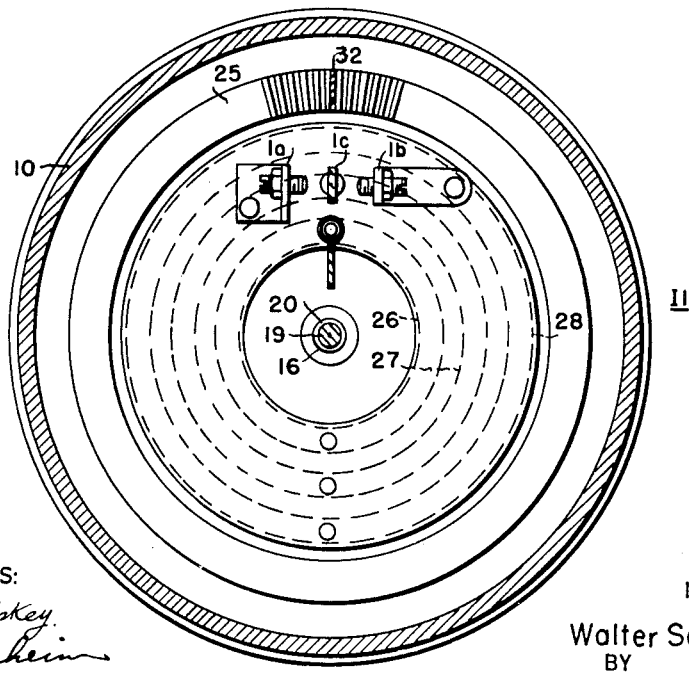

As will be seen by reference to all of Figures 1, 2 and 3, when the angular acceleration of the motors of the respective differential synchro units exceeds a predetermined magnitude, whether increasing or decreasing, one of the contacts such as 1a or 1b, for example, will be engaged by contact 1c to complete an electrical circuit therethrough. The selective control thus obtained is utilized to selectively energize the differentially related field windings of respective control motors CM1 and CM2.

This circuit in each instance originates at conductors L3 and L4 representing the supply of direct current control voltage. The output of respective motors CM1 and CM2 drives the rotating element of a frequency changer which may be a conventional three-phase wound stator wound rotor induction device. The direction of rotation of this device with respect to the rotation of the field supplied by respective generators GEN1 and GEN2 modifies the frequency of the voltage which is applied to the stator of respective synchro differentials ST1 and ST2, in such a way as to momentarily increase the output of the respective differentials in the proper direction to increase the rate of change of excitation of the respective motor fields.

For instance, consider the situation in which the speed of the motor M1 suddenly increases. In this instance, assume that the contact 1c engages contact 1a. This connection is such as to cause the motor CM1 to rotate the rotor of the frequency changer against the rotation of the electrical field of the stator thereof to momentarily increase the frequency appearing in the stator of the synchro differential ST1 with respect to the frequency of output of generator GEN1. This has the effect of further increasing the rate of change of output of synchro differential ST1 to move the tap of rheostat P1 at a higher rate of speed to thereby more rapidly correct the speed error which occurred. The movement of the tap of rheostat P1 will be in such a direction as to increase the excitation of the field of motor F1 to thereby reduce the motor speed. As the motor speed drops, the frequency of the output of generator GEN1 drops also. Since the motor CM1 by the selective contact control afforded by the inertia device is operated at a constant speed in one direction or the reverse, the frequency applied to the stator of the synchro differential ST1 also drops. The resulting change in the acceleration in the output of the synchro differential results in positive separation of contact 1c from contact 1a to interrupt the circuit for the control motor CM1. This motor now stops and as a consequence, the frequency of the alternating current voltage applied to the secondary of the synchro differential now becomes the same as that generated by the generator GEN1. The rapid correction of the speed of motor M1 has been made at this time and the slow follow up control moves the tap of rheostat P1 to the final position at which this speed is to be regulated.

Slip clutches C1 and C2 are provided between the respective synchro differentials ST1 and ST2 and the respective gear units G1 and G2 to obviate the possibility of running the tap of respective potentiometers P1 and P2 beyond their stops.

It will be appreciated from the illustration of Fig. 1 that the apparatus involved therein is simple, is inexpensive to manufacture, and equally important, is rugged enough to afford long periods of service with a minimum amount of maintenance. Moreover, the control afforded by the use of the inertia device in a regulator adjusted to provide relatively slow correction of the error quantity provides a control which is sufficiently fast for most applications but yet which is inherently stable in its operating characteristics.

Figure 4:
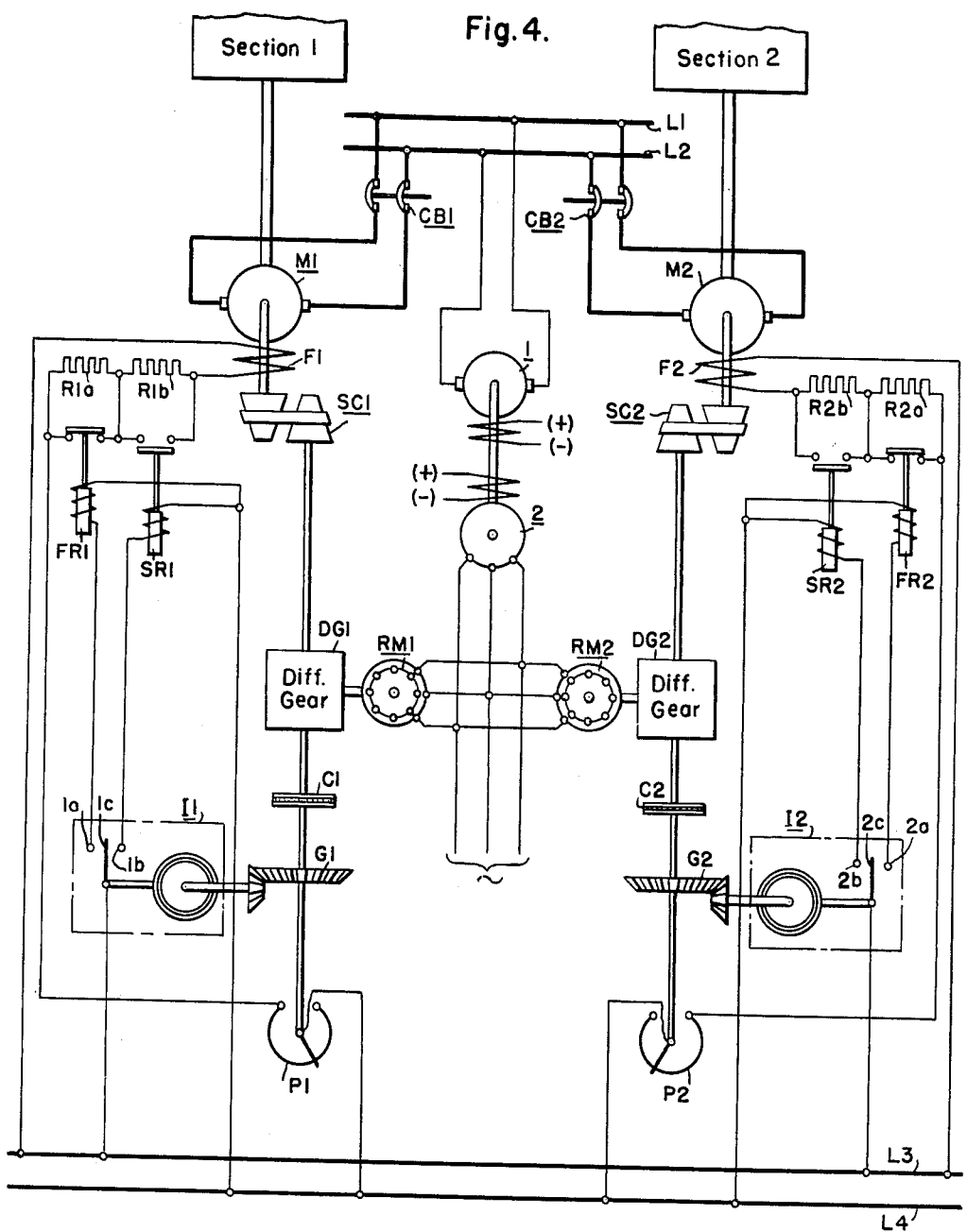
Fig. 4 is a diagrammatic showing of a control system according to this invention which is a modification of the system of Fig. 1.

The embodiment of the invention illustrated in Fig. 4 is similar in many respects to that illustrated in Fig. 1. To this end, those parts of Fig. 4 which correspond to parts of Fig. 1 have been given like reference characters.

In Fig. 4, the electrical differential represented by the differential type of synchro ties ST1 and ST2 in Fig. 1, have been replaced by suitable mechanical differentials as indicated in block form and designated DG1 and DG2 respectively. Inasmuch as the input to a differential of this type is of a mechanical nature, respective constant speed motors RM1 and RM2 supplied in parallel from the output of alternating current generator 2, which provides the speed reference voltage, are utilized to drive one input in the respective differential gears DG1 and DG2. The other input to the respective differentials in each case is connected to the output of respective speed changers SC1 and SC2 which are driven by the respective motors connected to the respective sections of the mill.

Field control of respective motor fields F1 and F2, in this case, is obtained in part by the use of fluttering relays, one, a fast relay, designated FR1 and a second, a slow relay, designated SR1. The normally closed contact of relay FR1 shunts resistor R1a connected in series with resistor R1b in the circuit of motor field F1. The normally open contact of slow relay SR1 shunts resistor R1b whenever this relay is energized. During normal operation, the relays will occupy the positions illustrated in which resistor R1a is shunted from the circuit. If the motor speed should suddenly increase, the contact 1c of the inertia device I1 engages contact 1a which energizes relay FR1 and opens the normally closed contact thereof to insert resistor R1a in series in the field circuit. This provides an abrupt weakening of the motor field to provide quick correction for the rapid rate of speed increase. When the acceleration of the output of differential DG1 drops below the minimum level for which the inertia device is designed, resistor R1a is again inserted in series in the motor field circuit and the slow follow up control provided by potentiometer rheostat P1 then provides the adjustment in field excitation which is required to maintain the motor speed at the proper level.

In the control of motor M2, resistors R2a and R2b controlled by respective flutter relays FR2 and SR2 operate in a manner similar to that described in connection with the control of motor M1. Consequently, further description in connection with this part of the control is believed to be unnecessary.

Figure 5:
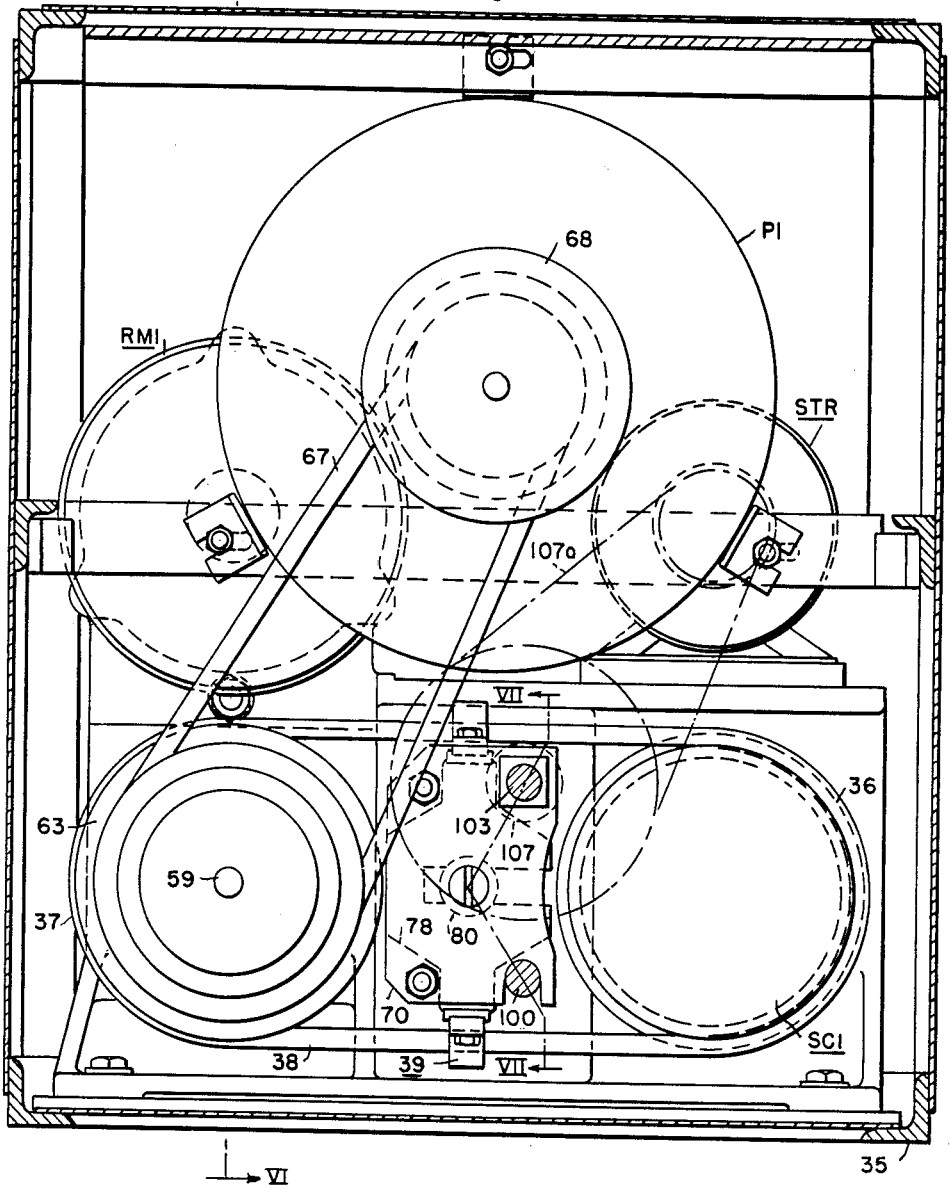
Figs. 5, 6 and 7 illustrate mechanical details of a specific differential type of position regulator embodied in the system of Fig. 4.
Figure 6:
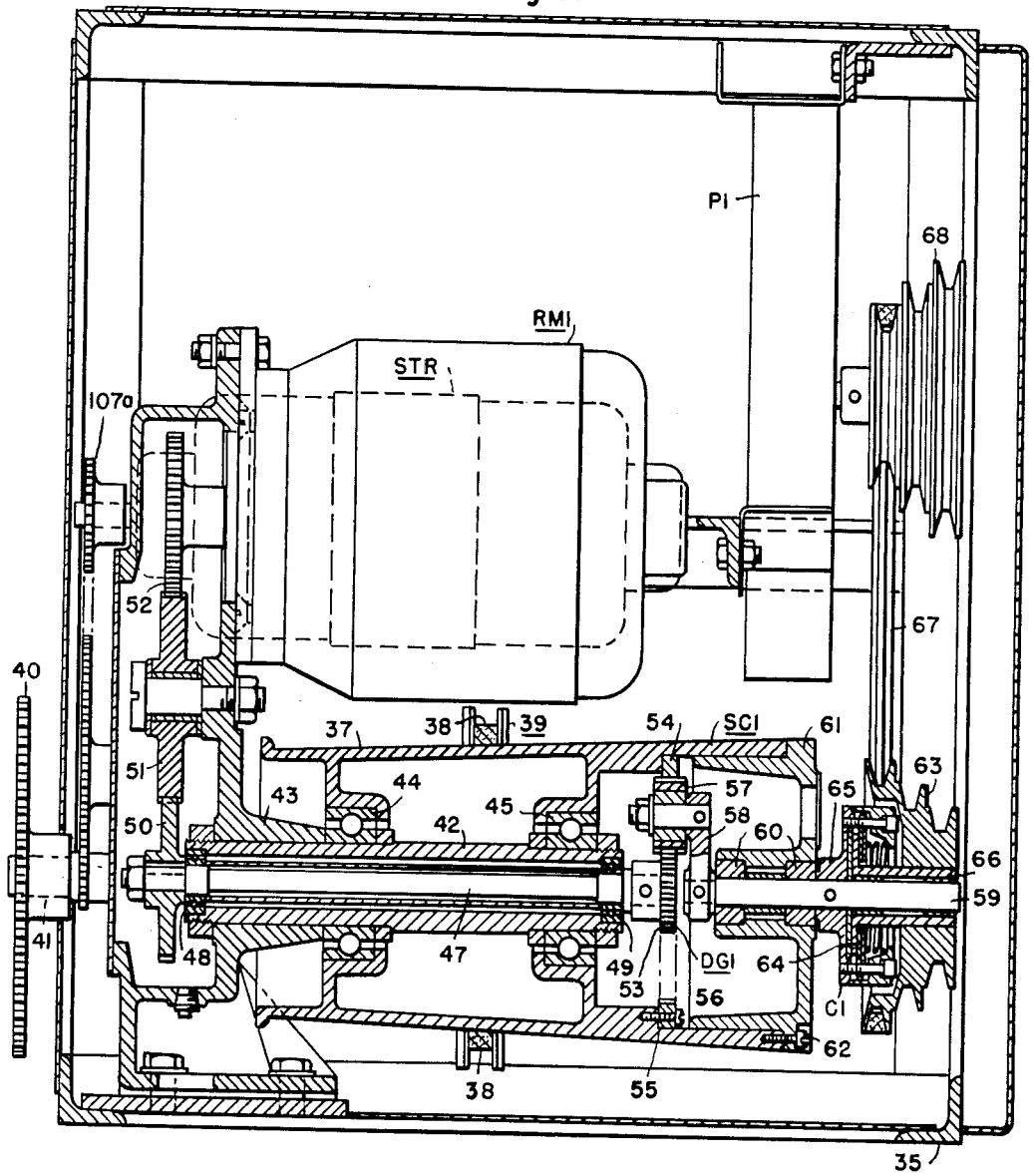
Figure 7:
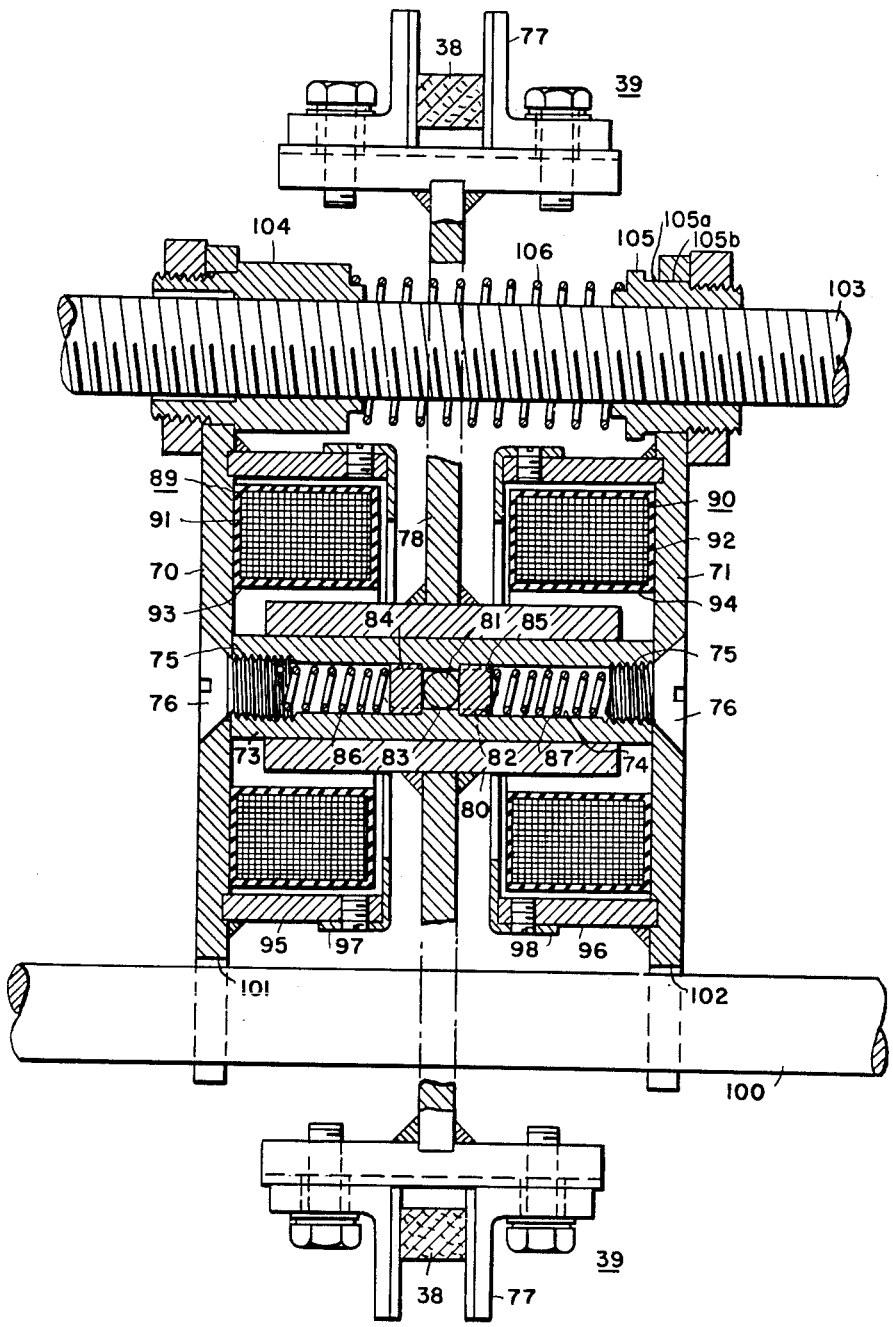

A particular type of speed error detector and regulator, the performance characteristics of which have been found to be an important adjunct to system control, is illustrated in Figs. 5, 6 and 7. The regulator illustrated in the three mentioned figures includes the speed changer SC1, a differential such as differential DG1, a constant speed motor RM1, a friction type of slip clutch such as C1 and a suitable gear or belt drive such as G1 for driving an electrical angular position detector such as P1.

The arrangement illustrated in Figs. 5, 6 and 7, is mounted within a fabricated frame or housing which is generally designated 35 and comprises the speed changer SC1 which includes a pair of cone pulleys 36 and 37 journaled about parallel bearing axes in side by side relation on the base of the housing. A belt 38 engaged by a belt shifter assembly generally designated 39 disposed between the cone pulleys is looped thereabout to provide a driving connection from cone pulley 36 adapted to be driven by the motor which is to be speed regulated. Thus depending upon the position of belt 38, along the respective cone pulleys, the cone pulley 37 will be operating at some speed either equal to, greater than, or less than the speed of cone pulley 36. Cone pulley 36 may be directly connected as shown in Fig. 4, for example, to the motor M1, or may be connected by means of a sprocket such as 40 mounted on the cone pulley shaft 41, to be driven by the motor which is to be speed regulated.

Compactness of this mechanical construction is achieved, as illustrated in the sectional view of Fig. 6, by mounting the mechanical differential DG1 completely within the larger end of the cone pulley 37. In this construction, the cone pulley is journaled about a hollow spindle 42, which is anchored in a support bracket 43 secured to the housing base. The bearings providing free rotation of cone pulley 37 are designated 44 and 45 and are mounted at axially spaced points along the hollow spindle 42.

The one input shaft to the differential DG1 is concentrically journaled within the hollow spindle 42. The left hand end of differential input shaft 47 is connected by a gear train comprising gears 50, 51 and 52 to a constant speed motor such as RM1 which provides rotation of this input shaft of the differential at the constant speed.

The illustrated differential comprises a plurality of spur gears. The sun gear 53, representing one point of input to the drive, is secured to the right hand end of differential input shaft 47. The second input point of this drive is represented in the internally toothed ring gear 54, which is securely mounted against a shoulder 55 formed integrally within the cone pulley 37. This secure mounting may be achieved by means of screws 56 which clear through suitable holes in the internal ring gear 54 and thread into suitably tapped holes in the shoulder 55. A plurality of planet pinions 57, only one of which is illustrated, are mounted in circumferentially spaced relation upon a planet carrier 58 which positions the planet pinions between and in mesh with the sun gear 53 and the internal ring gear 54. The planet carrier 58 is secured to the differential output shaft 59 journaled in bearings 60 in the cone pulley end plate 61 which is secured to the end of cone pulley 37 by means of screws 62.

Differential output shaft 59 is frictionally connected to a pulley 63 by means of the friction type of slip clutch generally designated C1. Pulley 63 represents the input to a drive corresponding to a gear drive of the type shown in Fig. 4 and designated G1. This friction clutch is conventional in principle, and comprises a plurality of friction plates 64 which are alternately connected to a clutch member 65 secured to output shaft 59 and a sleeve 66 rotatably mounted about the output shaft and secured to the pulley 63. With this arrangement, the magnitude of torque deliverable to the pulley 63 is determined by the transmitting capacity of the friction clutch.

Pulley 63 is connected by a belt 67 to a pulley 68 driving the potentiometer type of rheostat such as P1. Pulleys 63 and 68 are cluster pulleys utilizing a V-belt drive, and provide an interesting feature of the drive consisting in the adjustable gain or amplification of the regulator obtained by the use of such pulleys. It is always desirable to operate the regulating rheostat at maximum speed so as to obtain quick response of the system. However, in certain cases where the inertia of the section being regulated is high, it is desirable to reduce the speed of the regulating rheostat and this arrangement makes it relatively easy to do so by simply shifting the belt 67 to obtain the desired drive rate. This can be done by an inexperienced operator. A pickoff such as P1 can be connected to control the field of the driving motor as shown or, in the case of individual generator systems, may be used to control the generator voltage.

The drive ratio between the respective cone pulleys may be varied by adjusting the belt shifter assembly or carriage 39 axially of the cone pulleys. To this end, the belt shifter carriage is mounted for axial movement along the length of the pulleys. A sectional view of belt shifter carriage 39 is illustrated in Fig. 7. This section is taken through the carriage along an axis between and paralleling the axes of the cone pulleys, as illustrated by section lines VII—VII of Fig. 5. This belt shifter carriage comprises a body portion having end plates 70 and 71. These end plates are secured in spaced relation as indicated by a plurality of spacers 73, one of which is illustrated in Fig. 7. Spacer 73 is of tubular configuration having a hole 74 extending therethrough. The end portions of this tubular spacer are tapped at 75 as illustrated to receive screws 76 which extend through respective end plates 70 and 71 and thread into the tapped end sections to secure the assembly. The belt shifter 77 comprises a plate 78, the configuration of which is best seen in dotted outline in Fig. 5. This plate is provided with a hole centrally thereof and a sleeve bearing 80 is fitted therethrough and secured to the plate 78 by any suitable means such as welding. Sleeve 80 is slidably mounted about the tubular spacer 73 and is secured against rotation about the sleeve by means of a pin 81 which extends through and is secured in the sleeve 80 through a suitable slotted opening 82 at diametrically opposite points in the walls of the tubular spacer 73. Provision is made for centrally positioning the belt shifter 77 substantially centrally of the tubular spacer 73. Specifically this provision includes a shoulder 83 which is formed centrally within spacer 73. Plungers 84 and 85 are slidably fitted into the openings on opposite sides of this shoulder and abut the shoulder. These plungers are maintained in the position indicated by respective springs 86 and 87 which are compressed between the respective plungers 84 and 85 and the screws 76 threaded into the ends of the tubular spacer. In the position illustrated, the pin 81 is biased to the central position of the tubular spacer and when displaced to one side or the other it must move against the force of the respective springs which tend always to move the pin and, hence, the belt shifter to its central position and consequently, resiliently secure the belt shifter 77 in a central position on the belt shifter carriage 39.

The plate 78 is formed of magnetic material. Electromagnets 89 and 90 each comprising magnetizing coils 91 and 92 are disposed against the inner faces of end plates 70 and 71 with their respective poles confronting the plate 78 which now forms an armature for the respective magnetic circuits. Coils 91 and 92 are of circular configuration having openings 93 and 94 therein which fit about the sleeve 80 which slidably mounts the armature about tubular spacer 73. Circular sleeves of magnetic material 95 and 96 which are secured to the respective end plates 70 and 71 are fitted about the coils to complete the magnetic circuit for each coil. Small rings of non-magnetic material 97 and 98 may be disposed over the ends of the respective circular sleeves 95 and 96 in confronting relation with respect to the armature plate 78 to prevent this plate from sticking to either of the poles at the time the coil of the electromagnet is deenergized.

The belt shifter carriage is mounted upon a pair of bars which are supported between the ends of the housing 35 in positions paralleling one another and parallel to the axis of the respective cone pulleys 36 and 37. The lower bar 100 is secured in fixed relation with respect to the housing and forms a guide or track over which the end plates 70 and 71 may slide. To this end, suitable slots are provided at 101 and 102 in the bottom edges of these respective plates which fit about and engage the guide bar 100. The upper bar 103 is threaded along its length and is rotatably mounted in suitable bearings (not shown) in the ends of main housing 35. The threaded bar 103 engages nuts 104 and 105. Nut 104 is secured in respective end plate 70 adjacent the upper end thereof. Nut 105 is provided with a square or rectangular shank 105a which is slidably fitted through a correspondingly shaped hole 105b in end plate 71 adjacent the upper end thereof. Back lash is taken out of the threaded mechanical connection by means of a compression spring 106 which is compressed between respective nuts 104 and 105. This compression spring biases the nut 105 to the right, as viewed in Fig. 7, away from nut 104 a sufficient amount to securely engage the faces of the threads of the nuts with the faces of the threads of the threaded bar or shaft 103. Since the faces thus engaged are oppositely disposed, rotation of the bar in either direction results in positive movement without loss of motion of the belt shifter carriage in one direction or the reverse.

The means for rotating the threaded shaft 103 may be a suitable crank or nob 107 secured to the end of the threaded shaft in a position projecting beyond the boundaries of housing 35 so that it may be easily reached. Alternatively, a suitable synchro tie STR connected by a chain and sprocket drive 107a to this threaded shaft may be controlled from some remote station to automatically operate the belt shifter assembly.

With the structural arrangement herein described, the output of the differential is an indication of the difference in speed between the cone pulley 37, which is driven by the cone pulley 36, and the shaft 47 which latter represents the other input connection of the differential. The electrical intelligence developed in the potentiometer P1 or other similar device, controls the motor in such a way as to match the speed of cone pulley 37 with the shaft 47. In effect, the drive herein described is basically a position regulator comparing actual revolutions of the reference, represented in shaft 47, with the member being controlled, represented in cone pulley 37, which latter is operating at some speed which is a function of the speed of the member being controlled, such as the section motor of the mill drive. The drive, therefore, tends to synchronize the angular position of cone pulley 37 with that of shaft 47 tending always to insure maximum accuracy of regulation.

The draw of the section is controlled by the belt shifter carriage which is operated to a position along the cone pulleys such that the drive ratio therebetween affords the desired control of the motor driving a particular section of the mill to obtain satisfactory mill operation.

At times, however, it is desirable to effect a momentary change in the section draw in order to take up slack or introduce a slight amount of slack in the material between the section stands. This can be done conveniently without changing the draw setting for the particular section, through the control afforded by the magnets which provide slight adjustment of the belt shifter from its mid or neutral position between the two electromagnets.

These electromagnets may be connected in series with respective push buttons across a supply of electrical energy. Thus, selective energization of the magnets by operation of the respective push buttons will permit a small adjustment of the belt shifter with respect to the belt shifter carriage assembly to thereby provide a momentary adjustment of section draw.

An expedient such as this is desirable, for example, during threading operation when a web of material has been fed through the machine with the proper draw settings and it is desired to feed a new web therethrough. During such an operation, it is usually desirable to momentarily change the draw of a section to introduce a certain amount of web sag between the sections or to eliminate an excessive amount of sag. This may be done conveniently in this arrangement by simply energizing the proper electromagnet by means of the mentioned push button arrangement to momentarily move the belt shifter in the small amount indicated to thereby eliminate or introduce the degree of sag required.

Figure 8:
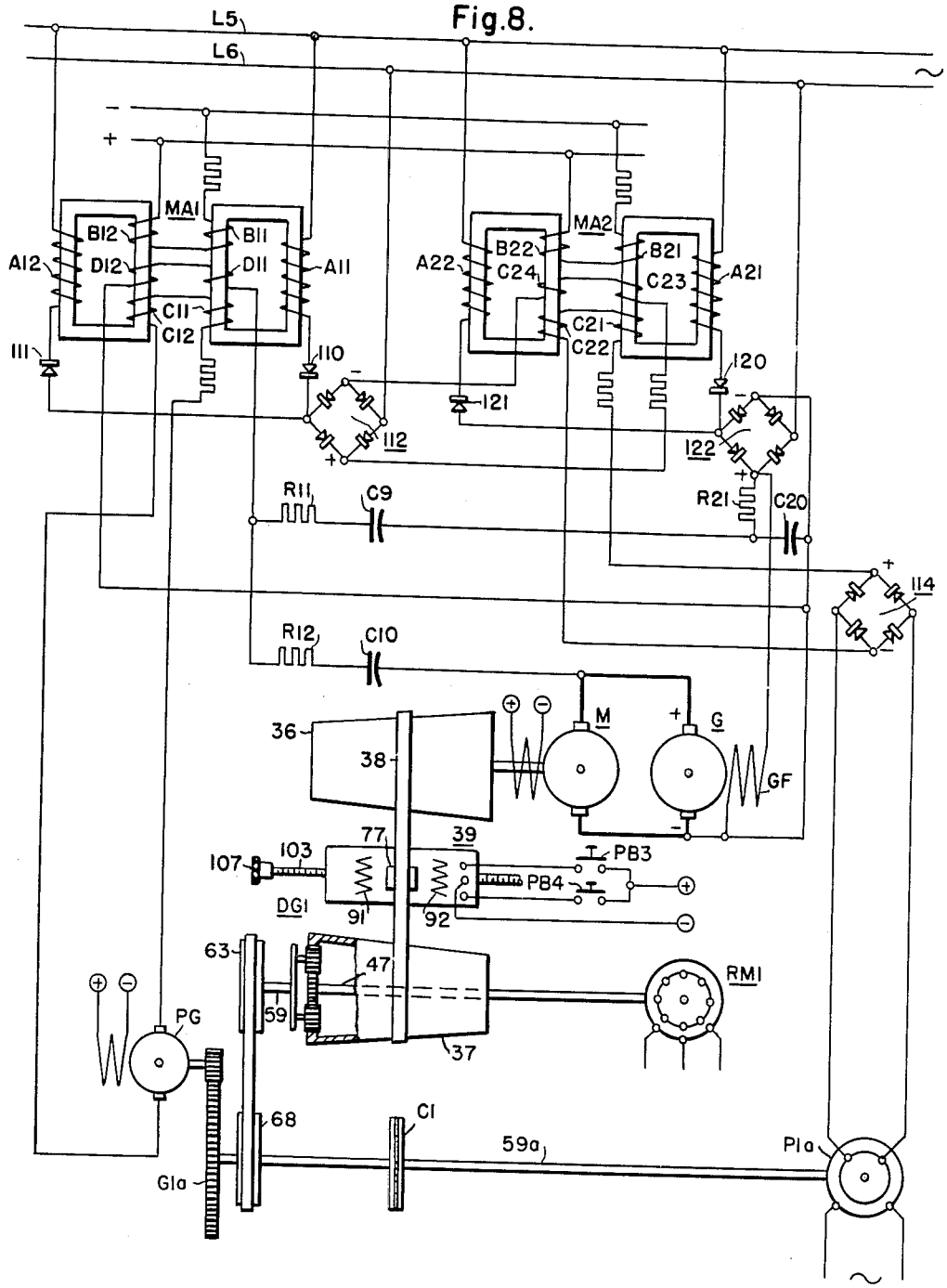
Fig. 8 is a diagrammatic illustration of a further embodiment of this invention.

In the embodiment of the invention illustrated in Fig. 8, a high-gain differential type of regulator is illustrated. In this embodiment of the present invention, parts corresponding to those appearing, for example, in Fig. 4 bear like reference characters. From an inspection of this figure, it will be appreciated that as in the case of Fig. 4, the system of Fig. 8 again employs a mechanical differential arrangement which compares the speed of a section motor designated M with the speed of a reference motor RM1. The mechanical details of this arrangement will be completely understood from the detailed description of this differential drive made in connection with Figs. 5, 6, and 7.

In this embodiment of the invention, the motor is energized by means of a generator G, the armature of which is connected in a series loop with the armature of the motor. The speed of the motor is controlled by armature voltage control obtained by proper control of the excitation of the field winding GF of the generator. The device, for example, a small wound rotor machine, which senses position error, in this case is designated P1a and comprises a wound stator which is inductively coupled with a wound rotor, the stator being adapted for excitation with a suitable supply of alternating current. In practice mechanical stops (not shown) limit angular movement of the rotor to 60°, over which range the induced voltage varies from zero to .866 of the maximum induced voltage. The rotor and stator are indexed, and the over-all system calibration is such that a given induced voltage appears in the rotor winding when the speed of cone pulley 37 is matched with shaft 47. At this time, the rotor of the wound rotor machine occupies a given angular position with respect to the stator. If the speed of cone pulley 37 differs from that of shaft 47, the rotor of the inductive device P1a will occupy a position in which a voltage is induced therein corresponding to the position error between cone pulley 37 and shaft 47 which appears in the output of the differential. This output voltage increases when the speed of cone pulley 37 exceeds that of shaft 47 and decreases when the speed of pulley 37 falls below that of shaft 47 and is utilized to control suitable electromagnetic means yet to be described which controls excitation of the generator field GF. Slip clutch C1 slips when the rotor of the device P1a engages the stops at either extreme of rotor movement.

An indication of the rate of change of error is obtained by means of a pilot generator designated PG which is driven through the step-up gearing G1a by the output of the differential drive DG1. This rate of error signal provides a degree of anticipation of an impending position error since the velocity error must exist before the position error can be accumulated. The voltage developed by the pilot generator is fed into the electromagnetic means to afford a suitable control thereof in controlling the generator field.

The electromagnetic means herein disclosed comprises a pair of magnetic amplifier devices which are respectively designated MA1 and MA2. Magnetic amplifier MA2 constituting the second stage of amplification comprises a pair of main windings A21 and A22, respectively, connected in series circuit relation with respective oppositely poled rectifiers 120 and 121. These respective series circuits are connected in parallel with each other in a series circuit including a bridge rectifier 122. This last-named series circuit is connected across a suitable supply of alternating current represented by supply conductors L5 and L6. The output of this amplifier, which is represented in a D.-C. voltage across the output terminals of bridge rectifier 122, is applied across the generator field winding GF and is the source of excitation for this field winding. The output of this rectifier is smoothed out by means of a filter circuit including in series across the output of the bridge rectifier a resistor R21 and a capacitor C20.

This amplifier is controlled by two sets of control voltages, one of which is represented in the output of magnetic amplifier MA1 and which is applied to control windings C23 and C24 and the other of which is represented in the voltage appearing across the output terminals of a bridge rectifier 114 which is energized by the output of the rotor winding of the position error detector P1a. This amplifier MA2 is biased to cutoff by bias windings B21 and B22, the magnitude of its output being controlled by saturation control windings C21, C22 and C23, C24 which are differentially related to the bias windings B21, B22.

Magnetic amplifier MA1 may be physically similar to MA2 being provided with a pair of main windings A11 and A12, respectively, connected in series with respective rectifiers 110 and 111 which are oppositely poled. These respective polarized main winding circuits are connected in parallel in a series circuit with bridge rectifier 112 across alternating-current supply conductors L5 and L6. The output terminals of bridge rectifier 112 are connected across the series-connected control windings C23 and C24 of magnetic amplifier MA2.

Bias windings B11, B12 of this amplifier bias the operation to the midpoint of the more linear portion of its operating characteristic. Two control signals are applied to magnetic amplifier MA1. One is the rate of change of position voltage, generated by the pilot generator PG, which is applied across the series-connected control windings C11 and C12, and the other of which is a damping voltage developed by feeding back the rate of change of output voltage of magnetic amplifier MA2 and the rate of change of motor armature terminal voltage, in parallel circuit branches connected across the series-connected damping windings D11 and D12. Damping windings D11 and D12 are cumulative with respect to bias windings B11 and B12. In these respective damping circuits, sensitivity to the rate of change of output voltage of magnetic amplifier MA2 and to the rate of change of motor armature terminal voltage is achieved respectively by the series-connected resistors and capacitors R11 and C9 in one circuit, and in the other circuit R12 and C10. While the resistor-capacitor type of differentiating circuit has been illustrated, it will be appreciated that such a rate of change of voltage may be derived across a suitable transformer, the secondary voltage of which will obviously be proportional to the rate of change of the corresponding feedback voltage. Thus, the output of magnetic amplifier MA1 is damped in dependence of the rate of change of the two mentioned voltages to provide the required degree of stability of operation of the system.

Inasmuch as the angular velocity of differential output shaft 59 is reversible, it will be appreciated that the output of pilot generator PG, driven by shaft 59 through step-up gearing G1a, is also reversible. This voltage is applied to control fields C11 and C12 in such a way as to more highly saturate the amplifier when the speed of motor M is too low and to reduce saturation when the motor speed is too high. Thus, these respective conditions, reflected in the output of amplifier MA2, maintain the speed of motor M substantially at the desired speed.

As will be observed from the schematic physical representation of the magnetic amplifiers, each comprises a pair of magnetically isolated magnetic circuits carrying the respective main windings. The series-connected control windings are inductively associated with the respective magnetic circuits to afford a control over the impedance of the corresponding main winding. In each case, the output voltage appearing across the output terminals will always be of one polarity since it is not necessary to reverse the drive. As a consequence, the control ampere turns are applied in such sense in each magnetic circuit of the respective magnetic amplifiers as to reduce the impedances or to increase the impedances, as required, of both of the main windings when an error in speed occurs.

Thus, for example, assuming that the speed of motor M should be increasing, the output voltage of the position error detector will decrease, indicating that motor M is attempting to drive the cone pulley 37 ahead of the shaft 47 of the differential. The ampere turns thus removed from the control windings C21 and C22 lower the degree of saturation of amplifier MA2 and tend to increase the impedance of both main windings A21 and A22. This reduces the current circulating in the main winding circuit of this magnetic amplifier and, as a consequence, reduces the excitation of the generator field GF. The resulting drop in generator voltage lowers the motor armature terminal voltage to proportionally match the motor speed, through cone pulley 37, with shaft 47 driven by reference motor RM1.

The rate of change of position control is provided by output voltage of pilot generator PG which appears in control windings C11 and C12 of magnetic amplifier MA1. Thus, in the situation herein described, when the motor speed has increased, the ampere turns of control windings C11 and C12 will be in such direction as to reduce the degree of magnetic saturation and increase the output of windings A11 and A12 to lower the output of magnetic amplifier MA1 and thus provide a quick stimulus of such magnitude in the amplifying system for controlling the generator field in a direction tending to prevent the change of motor speed. This operation is damped by means of the feedback voltages from the output of magnetic amplifier MA2 and motor armature terminal voltage which is applied as a control current through the damping windings D11 and D12 which tends to limit the rate at which the change may take place.

The control features of the position regulator provide, for instance, by rotation of screw 103 by means of handle 107, a variation in the speed of motor M with respect to the speed of the reference motor to establish the required draw for the mill section, which draw may be momentarily varied by selective operation of push-buttons PB3 or PB4 to obtain momentary adjustment of the belt shifter 77 with respect to the belt shifter assembly 39 by means of the described electromagnetic control in the belt shifter assembly.

By utilizing a properly damped system such as herein described, a system having a relatively high gain may applied. Thus, this drive may be set to provide relatively fast correction for a change in speed of the motor M to thereby minimize the tendency of the system to accumulate a relatively large change in the quantity being controlled before the control takes effect to correct the error. However, it should be appreciated that while this system provides a relatively high gain, the complexity of the system is a minimum consistent with operating requirements and utilizes only such components in its organization as are rugged and have a relatively long, useful life.

Figure 9:
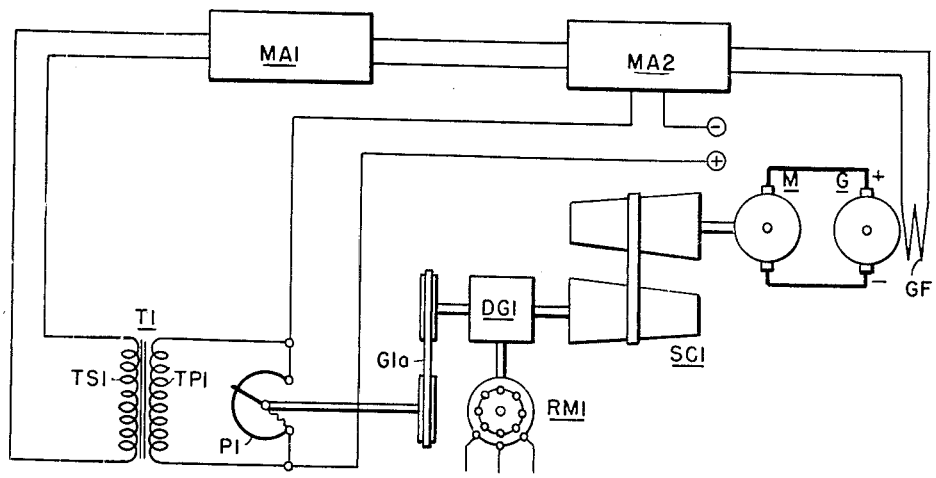
Fig. 9 is a detail of a portion of the circuit of Fig. 8 showing a different method of detecting position error and rate.

Fig. 9 shows another way of detecting the rate of change of position of the differential output shaft 59 than by means of a pilot generator such as PG. Only a fragmentary portion of the system is needed to show this detail.

In this arrangement the output of differential DG1 drives the tap of a potentiometer rheostat such as P1 to vary the voltage drop thereacross. This is the position error voltage. A transformer T1 has the primary winding TP1 connected thereacross P1. The secondary winding TS1 may be connected to control windings such as C11 and C12 of magnetic amplifier MA1. Similarly the variable resistance of the potentiometer rheostat P1 may be used to control the excitation of control windings such as C21 and C22 of amplifier MA2. The voltage appearing in the secondary winding of transformer T1 being proportional to the rate of change of primary voltage affords a control of an amplifier such as MA1 in dependence of the rate of change of the error signal.

In some instances it may be found desirable to apply the position error voltage to a control winding or amplifier MA1 to obtain additional amplification of the position error signal. Among other reasons an important consideration is as follows.

The output torque of the constant speed motor RM1 depends upon the angular displacement of the rotor with respect to the rotating electrical field. In the system herein described this machine functions as an angular position reference. Hence, it is desirable to load this machine as lightly as conditions permit in order to avoid introducing position inaccuracy at this point. Thus, by applying the output voltage of position error detector P1a to the first stage of amplification the gain of the position error signal is increased appreciably which permits the use of a detector in this instance which is physically smaller for example than that employed in Fig. 8, reducing the load on the constant speed motor.

Figure 10:
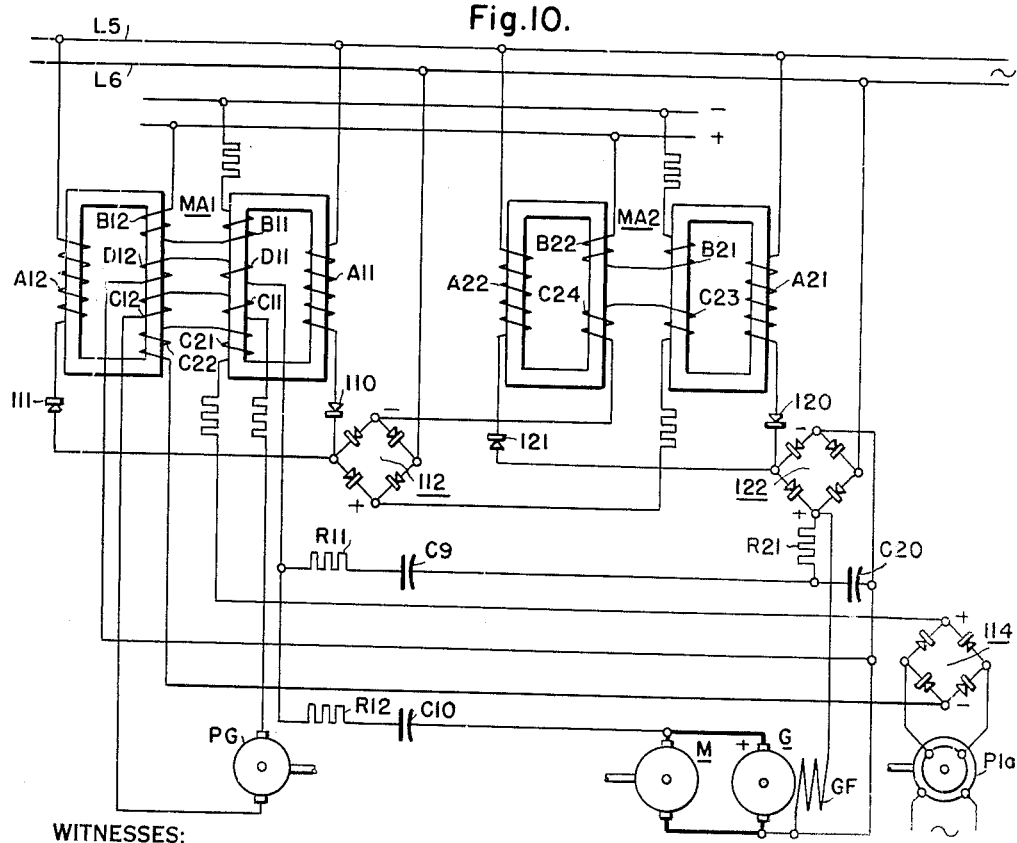
Fig. 10 is a further variation of Fig. 8.

The arrangement of Fig. 10 corresponds in all respects to that of Fig. 8 with the exception that windings C21 and C22 formerly on magnetic amplifier MA2 are now disposed on magnetic amplifier MA1 to obtain higher gain. Magnetic amplifier MA1 is now biased to cutoff and the output of the error detector appearing as ampere turns in control windings C21 and C22 under steady state conditions (zero position error) drives the output of the amplifier to about the midpoint of its characteristic. When the speed of motor M is too high the output of the position error detector decreases driving amplifier MA1 further away from saturation, decreasing its output. This condition is now amplified in amplifier MA2 and applied to the generator field, reducing the motor armature voltage and tending to decrease motor speed. When the motor speed is too low the control strengthens the generator field tending to increase motor speed. Otherwise the function of the system of Fig. 10 corresponds to that of Fig. 8.

The foregoing disclosure and the several illustrations in the drawings represent illustrative embodiments of the principles of this invention. It will be appreciated by those skilled in the art that numerous other organizations embodying the same principles but differing in details both in structure and in function may be derived from the teachings of this invention. Accordingly, it is intended that the foregoing disclosure and the illustrations in the drawings shall be considered only as illustrative of the principles of this invention and not interpreted in a limiting sense.

I claim as my invention:

1. A motor speed control system comprising, a pair of cone pulleys, a belt drive interconnecting said pulleys, means connecting one pulley to the motor, a differential having two input connections and an output connection, a constant speed drive engaged with one input connection, the other input connection being engaged with the other of said pulleys, a movable carriage, a belt shifter engaged with said belt drive and resiliently mounted on said carriage, said belt shifter moving with said carriage to move said belt along said pulleys to change the relative speeds of said pulleys, actuator means connected with said carriage and said belt shifter for moving said belt shifter small amounts relative to said carriage to obtain small speed variations of said other pulley, and electrical means connected with said output shaft for controlling said motor.

2. Apparatus as recited in claim 1 in which said actuator means comprises an electromagnet.

3. A speed control system comprising, a constant speed drive, a variable speed drive, differential means responsive to the difference in speeds of said drives for producing a control quantity, a first magnetic amplifier having an output circuit for controlling said variable speed drive, a second magnetic amplifier having an output circuit for controlling said first magnetic amplifier, electrical position sensitive means responsive to said quantity for controlling said first magnetic amplifier, and electrical rate sensing means responsive to the rate of change of said quantity for controlling said second magnetic amplifier.

References Cited in the file of this patent

UNITED STATES PATENTS

| 1,936,787 | Gork | Nov. 28, 1933 |
| 2,171,747 | Guilliksen | Sept. 5, 1939 |

FOREIGN PATENTS

| 152,266 | Switzerland | Apr. 16, 1932 |
| 155,799 | Switzerland | Sept. 16, 1932 |
| 40,097 | Netherlands | Feb. 15, 1937 |